(12) United States Patent
Miller et al.

(10) Patent No.: US 7,055,847 B2
(45) Date of Patent: Jun. 6, 2006

(54) COLLAPSIBLE SUPPORT STRUCTURE

(76) Inventors: Mark E. Miller, 3055 Williams La., Versailles, KY (US) 40383; Joseph C. Miller, 1208 Mountain Brow Rd., Fort Payne, AZ (US) 35967

( * ) Notice: Subject to any disclaimer, the term of this patent is extended or adjusted under 35 U.S.C. 154(b) by 236 days.

(21) Appl. No.: 10/636,426

(22) Filed: Aug. 7, 2003

(65) Prior Publication Data

US 2004/0070179 A1 Apr. 15, 2004

Related U.S. Application Data

(60) Provisional application No. 60/402,460, filed on Aug. 9, 2002.

(51) Int. Cl.
*B62B 1/00* (2006.01)
(52) U.S. Cl. ............... 280/638; 280/35; 248/161
(58) Field of Classification Search ............... 280/638, 280/35, 639, 640, 42, 649, 641, 651, 79.11, 280/79.2, 47.34; 248/97, 98, 99, 161, 129
See application file for complete search history.

(56) References Cited

U.S. PATENT DOCUMENTS

| | | | | |
|---|---|---|---|---|
| 1,081,221 | A * | 12/1913 | Durkin | 280/641 |
| 4,192,541 | A * | 3/1980 | Ferneau | 296/20 |
| 4,989,890 | A * | 2/1991 | Lockard et al. | 280/42 |
| 5,915,722 | A | 6/1999 | Thrasher et al. | |
| 6,050,582 | A * | 4/2000 | Horacek | 280/250.1 |
| 6,616,172 | B1 * | 9/2003 | Cockram | 280/647 |

\* cited by examiner

*Primary Examiner*—Christopher P. Ellis
*Assistant Examiner*—Brian Swenson
(74) *Attorney, Agent, or Firm*—Jack Toliver

(57) ABSTRACT

A collapsible support structure has pairs of leg members (17) pivotally joined intermediate their length in crossed fashion by a connection member (18) that is capable of sliding longitudinally with the pivotal joint as the leg members extend in a scissors—like manner to support an object.

12 Claims, 10 Drawing Sheets

COLLAPSIBLE SUPPORT STRUCTURE

CROSS REFERENCE TO RELATED APPLICATIONS

This application is related to a U.S. Provisional Application, Ser. No. 60/402,460 filed Aug. 9, 2002. It has the same title and is by the same inventors as this application and is fully incorporated herein by reference as to the common subject matter for which this application relies on for priority of invention.

BACKGROUND OF INVENTION

The present application was funded in part by the Kentucky Science and Technology Corporation [KSTC], a Commonwealth of Kentucky business development entity located in Lexington, providing funding for developments in the Blue Grass region of Kentucky. The KSTC provides grants and early phase investment capital for business development and innovations in cooperation with the State Economic Development Cabinet. This invention was evaluated by KSTC staff members and deemed to merit grant funding. Although neither KSTC nor the Commonwealth of Kentucky acquired any right, title or interest, or license, express or implied, to the invention, or patent applications, or any continuing applications, resulting patents, or reissues, domestic or foreign, by its funding support, the inventors greatly appreciate KSTC's involvement and that of its capable staff for their confidence, suggestions and interest in the success of this development as an innovation warranting start-up enterprise funding likely to lead to job creation in the Blue Grass Region [Lexington, Fayette County, Ky. and surrounding areas] of the Commonwealth.

Collapsible supports for tables and carts are known that have folding legs and braces that lock in a raised position and unlock to allow the legs to fold for storage or transport. These tables or carts generally lack stability when they are designed to move, i.e., mounted on wheels, or are traveled over uneven ground. And in trying to achieve support heights of thirty or more inches, with heavy or bulky loads, they are inherently unstable because of the additional factor of the load's center of gravity being in an elevated position. This necessitates additional bracing of the collapsible support mechanism itself, or it must be of a more rugged construction. This reduces the table or cart's storage or collapsed size. Often compactness, for ease of transport, is critical. But stability is especially important for supporting and moving scientific instruments and computers with related peripheral hardware. Especially over uneven ground, into and out of elevators, or from parking lots and through airport security.

SUMMARY OF INVENTION

In accordance with the present invention, a collapsible support structure comprises a pair of elongated leg members pivoted intermediate their lengths in crossed relationship capable of a scissors-like pivotal motion. A connection member between the pairs of leg members provides the pivotal connection between them, which connection member also slides longitudinally relative to each leg member so that the pivotal connection moves within a triangular geometry that includes it, at the apex, and the lower ends of the leg members at the corners thereof, with the connection member traveling in a rectilinear manner equidistant between the corners. A latch mechanism locks the connection member against sliding relative to leg members in the raised position where the pivotal connection is at its apogee relative to the lower ends.

In a preferred construction, the elongated leg members include tubular lengths and the connection member comprises a bracket between the tubular lengths to which a pair of sleeves are pivoted. The sleeves pivot on the bracket while sliding on the tubular lengths. The latch mechanism includes a leaf spring on at least one sleeve biased toward the axis of the tubular length having a pin on one end that engages aligned holes in the sleeve and tubular length in the fully raised locked position. A cam arrangement is actuated by a release handle that causes the leaf spring to lift clearing the pin from within the aligned holes to unlock the sleeve and tubular length permitting relative sliding motion in the unlocked position.

In an hydraulic variation of the mechanical latch mechanism described above, the hydraulic version includes a sealed chamber within the tubular length having a spring biased plunger acting on a hydraulic fluid sealed within the chamber. A passageway contains a spring biased pin aligned with the holes that projects into them locking the sleeve and tubular length in the raised position when the plunger is applying pressure to the hydraulic fluid. A remote release lever is actuated to compress the plunger spring and relieve the fluid pressure on the locking pin which is retracted by its spring to the unlocked position.

In a particular application of the support structure for a laptop, a first frame member provides a supporting base for the computer fastened inside of a carrying case. The case has a bottom compartment that opens downwardly beneath the computer containing the first frame member. The upper ends of the leg members via the connection member are attached to it. A second frame member provides a base that can be leveled on a floor, or other uneven surface, and may have wheels for easy transport. The lower ends of the leg members are attached to it. The connection member travels in vertical alignment with the center of gravity of the laptop during the scissors-like motion of the leg members.

The frame members may be four sided in shape overlaying each other and in that case, there are two pairs of leg members, one pair scissors on one side and the other on the opposite side of the frame members and a rigid cross member extends between the two connection members to provide lateral stability.

Where the raised height needs to be greater, the leg members may be telescoping tubular sections. The outer tubular section will be the lower end and the inner tubular section the upper end of the leg members. A ball and aligned-hole release mechanism between the two sections may be used to independently release the inner to slide within the outer tubular section and lock it in the fully raised position.

In this variation, the sliding sleeve of the connection member will travel on the outer tubular section and carry the leaf spring of the latch mechanism. The locking pin will engage through a hole in the sleeve when aligned with a hole in the outer section when the cam mechanism is in the locked position.

In this variation, it is important that the upper ends and lower ends of the leg members are in alignment with each other throughout the scissors-like action of raising and lowering and travel in parallel with the connection member as corners of opposed triangles, the apexes of which are joined at the pivotal connection established by connection member so as not to depart from the triangular geometry of the support structure from which it gains its superior strength.

Accordingly, it is a principal object of the invention to provide a versatile, collapsible support structure having greatly improved stability and strength in the raised position for holding heavy or bulky objects, and when mounted on wheels, provide mobility without losing stability with the load in a raised position.

Another object of the invention is to provide a lightweight, folding, four footed mobile cart especially good for transporting technical equipment over uneven ground, as may be useful to a veterinarian in using diagnostic equipment in horse barns, and that is collapsible to a very compact state for ease of transport, as when traveling in an automobile, by slipping it behind the car seat in the collapsed state, after removing the equipment or carrying it within the cargo area with the equipment secured in place.

Another object is to provide a computer carrying case that has a built-in collapsible support structure which allows the case and computer to be transported, if desirable, on wheels from a car left at an airport parking lot, to security check-in, and then the support structure is folded up into the case for inspection of the case on a conveyor belt passing through an x-ray screener, usually after removing the laptop which is inspected separately, and then the support structure is re-erected by pulling it from its compartment on the bottom of the case so the computer and case can be pulled to the gate where it can stay erected as a temporary work station while awaiting departure.

Another object is to provide a collapsible support structure that is smooth to operate and can be raised to considerable heights without losing its stability, and yet collapsed to a very compact size.

These and other objects will become more apparent by referring to the following detailed description.

DETAILED DESCRIPTION

Figure 1:
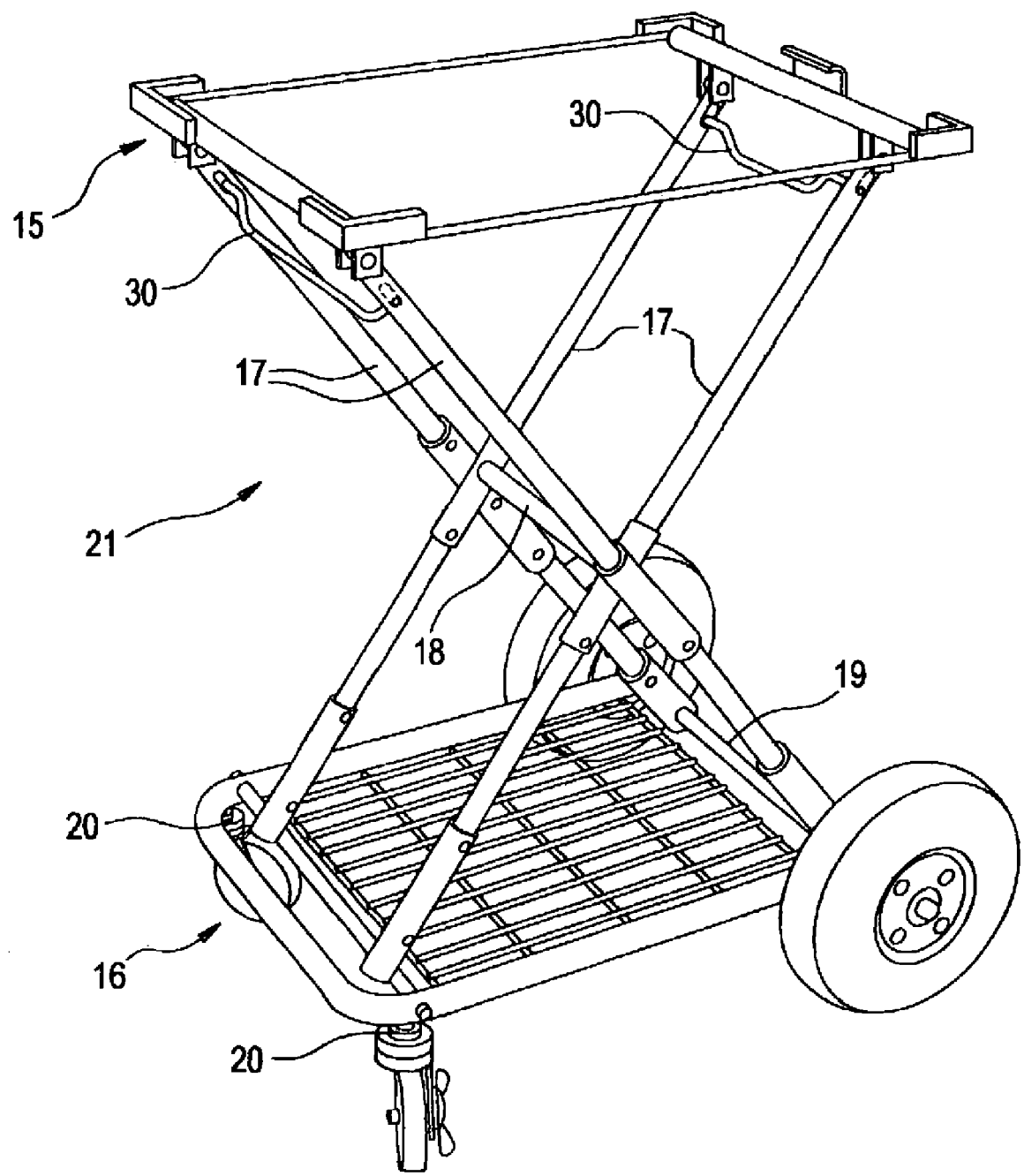
FIG. 1 is an isometric projection of the invention in a four wheeled hand cart shown raised to its full height of about thirty two inches employing ten inch wheels on one end of a lower frame and four inch caster wheels on the other in a cart designed for handling scientific equipment and transporting it securely over uneven ground.
Figure 2:
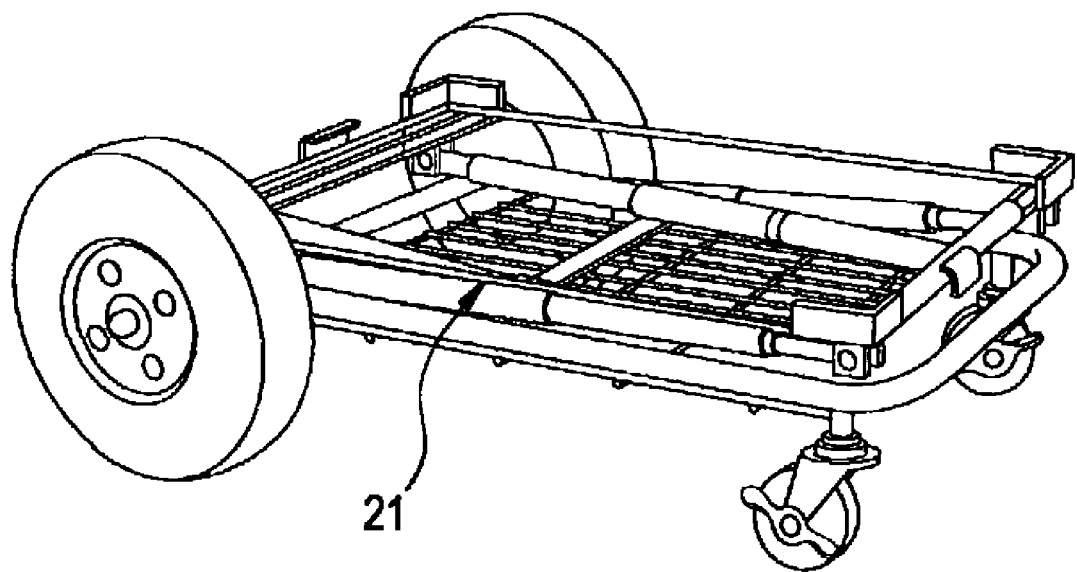
FIG. 2 is an isometric projection of the cart in FIG. 1 shown collapsed to its fully lowered position, turned facing the opposite direction, illustrating the compactness of this particular object, so compact it will fit behind a car seat in the lowered position shown.

Referring to FIGS. 1 and 2, a collapsible support structure (21), according to a preferred embodiment of the invention, is associated with a hand cart having an upper rectangular frame (15) adaptable for carrying a bulky load, like a monitor or oscilloscope (not shown). This frame is directly above a bottom rectangular frame (16) of similar size and shape. The two frames are roughly seventeen by twenty two inches. The bottom frame is adaptable for carrying separate, usually related heavy items to those on the upper frame, such as a computer, and possibly a DC battery power source (also not shown).

The bottom frame (16) has a horizontal axle (19) on one end. It rotatably supports a pair of ground engaging wheels, approximately ten inches in diameter. On the other end, a pair of smaller caster wheels are mounted. They are approximately four inches in diameter. They can swivel on vertical axles (20) and also rotate providing a turning capability to the cart since the larger wheels do not swivel, but are of a size to easily negotiate uneven ground.

In FIG. 2 the cart is shown in the lowered position, facing in the opposite direction from FIG. 1. This view illustrates the compactness for transporting the cart. This degree of compactness is capable of being realized because of the unique features of the collapsible support structure (21) of the invention, described in greater detail below. In the fully lowered position, as depicted in FIG. 2, the overall height is within the diameter the larger wheels. The intent is to be able to place the cart behind a car seat, if stood on end, after removal of the equipment, or leaving the equipment on the upper frame, and removing that on the bottom, to be able to roll the lowered cart from place to place and quickly re-erect it in another work area, if the intervening ground is very uneven, or in transporting the cart, leaving the upper frame mounted with equipment, the lowered cart will easily fit into a vehicle rear compartment or trunk area.

The cart, at full extension of the collapsible support structure (21), is some thirty inches high. This creates a high center of gravity when carrying bulky items on the upper frame. The tendency for tipping has to be taken into serious consideration when valuable scientific equipment is involved. Here is another important feature of the invention. The collapsible support structure (21) provides unique stability and strength in the raised position allowing the cart to navigate over relatively unimproved surfaces even in the raised position while bearing heavy loads.

According to the invention, a preferred embodiment of the collapsible support structure (21) comprises elongated leg members (17) pivoted intermediate their lengths to a connection member (18) which is capable of a compound pivotal and sliding action creating a complex scissors-like motion of the leg members when raising or lowering the cart. The leg members preferably are tubular lengths of telescoping sections, where inner sections are pivoted at the corners of the upper frame, and outer sections pivot at the corners of the lower frame. The connection member (18) transversely stabilizes the leg members about a horizontal pivot axis while sliding on the outer tubular sections in creating the compound scissors-like motion by which the leg members, at each pivotal mounting, extend smoothly, and in unison, in a vertical rectilinear fashion maintaining an opposed triangular geometry with the horizontal pivot axis of the connection member at the apexes of the triangles. This is a critical feature of the invention and will now be described in greater detail.

Figure 3:
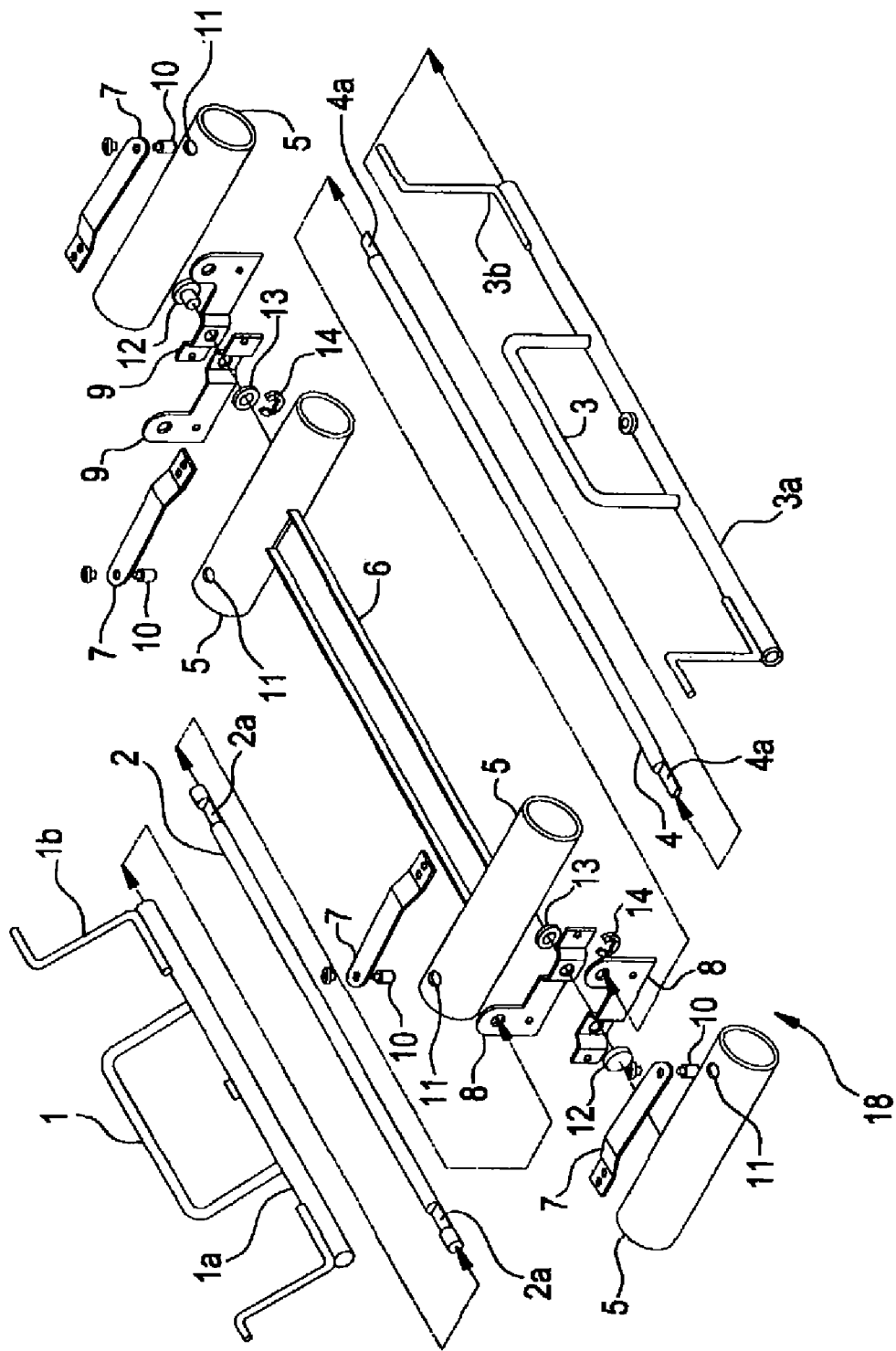
FIG. 3 is an exploded view of a preferred type of connection member employed with a cross member in between pairs of sliding sleeve elements and a latch mechanism using a type of cam release for the leaf springs carried on each sleeve element.

FIG. 3 is an exploded view of the connection member (18). Pairs of sleeves (5) are pivoted together on brackets (8, 9) at the ends of a cross member (6). This assembly includes pivot pins (12), washers (13) and locking washers (14) securing the brackets together for relative pivotal motion. Sleeves (5) are fixed to the brackets (8,9) and thus pivot about the common horizontal axis of the pins (12), transversely between the leg members (17) on opposite sides of the cart.

Attached to each sleeve (5) is a latch mechanism. It includes a leaf spring (7). It has a locking pin (10) on one end biased inwardly toward the axis of the sleeve in alignment with a hole (11) in the sleeve through which the locking pin projects in the locking position.

A latch mechanism includes a pair of cam shafts (2,4) having flat cam surfaces (2a, 4a) on opposite ends that project from the opposite ends of tubes (1a, 3a) of butterfly actuator handles (1,3). The cam shafts are adjustable longitudinally and angularly within the tubes (1a, 3a) and extend transversely in parallel alignment supported on each end for rotation by an upwardly extending projection of brackets (8, 9) such that the flat cam surfaces extend beneath an associated leaf spring (7).

Figure 4A:
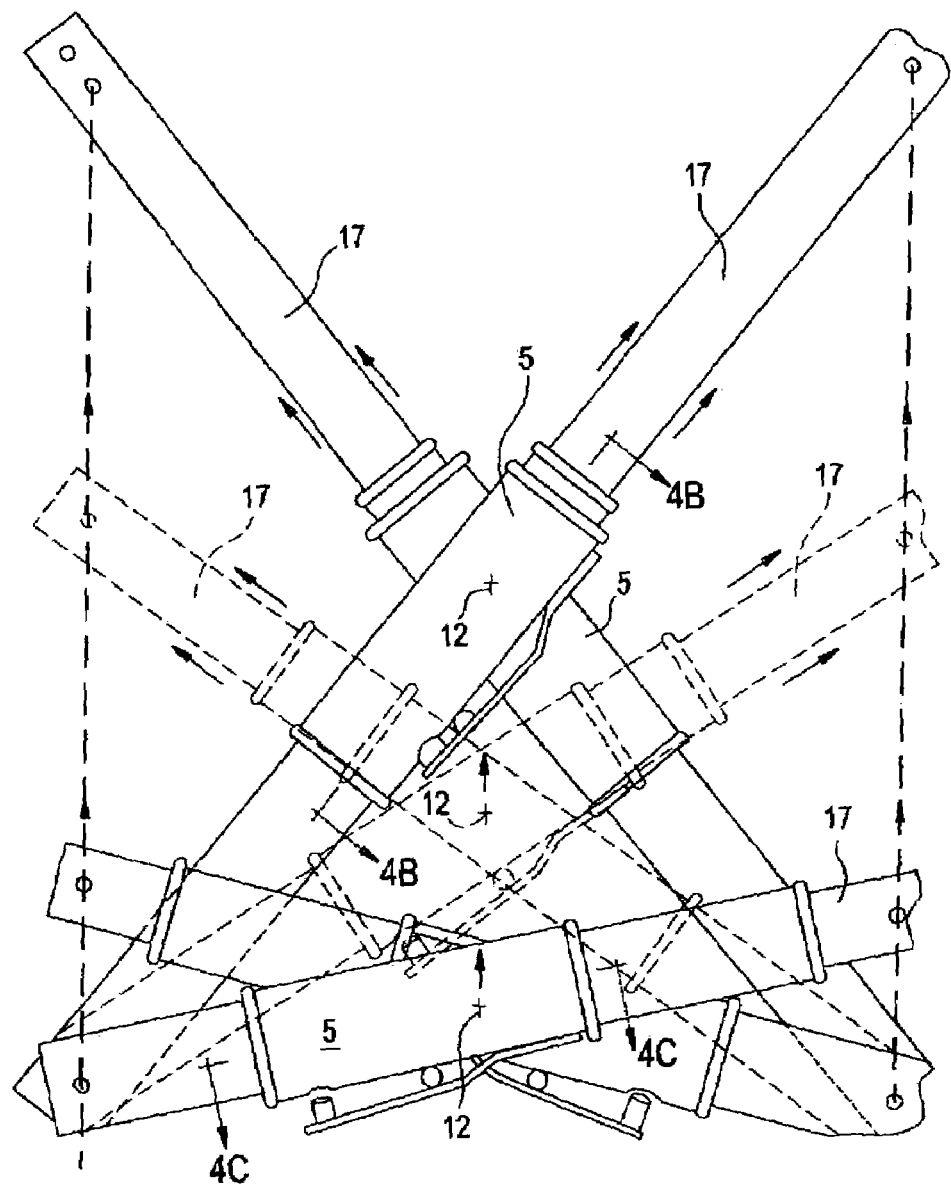
FIG. 4A is a multi-positional view depicting the scissors-like action of the invention with arrows depicting the extension of inner tubular leg sections from outer tubular leg sections, and the sliding sleeve elements respective positions thereon.

As depicted in FIG. 4A, when the leaf springs are in the locked or down position, the locking pin (10) is biased inwardly so as to project through hole (11) in the sleeve which upon becoming aligned with a hole (not shown) in the leg member (17) during extension projects into that hole locking the leg member and sleeve against further relative motion. The cam shafts have to be both rotated so that the flat cam surfaces are facing outwardly to allow the inward bias of the leaf spring to operate in setting the locking pin into its locked position, as depicted by the upper position shown in FIG. 4A. Rotating the butterfly handles (1, 3) approximately ninety degrees turns the flat cam surfaces lifting the leaf springs to the unlocked position, as depicted in the dotted line, and partially lowered full line positions, in FIG. 4A. In this position the leaf springs are raised fully disengaging the locking pins (10) allowing the sleeves and leg members to slide relative to each other.

Noteworthy of the compound angular and rectilinear, scissors supporting action, is the relative sliding and angular motion of the sleeves (5) on the outer tubular sections of the leg members (17). Each sleeve (5) has an extended body portion providing circumjacent sliding support for the telescoping linear action of the tubular sections. As the inner tubular sections extend as a result of raising the cart by lifting of the upper frame member to which they are fixed, the tubular sections extend while being structurally supported by the sleeves (5), the added longitudinal support occurring as the sliding body portions of the sleeves (5) travel with the telescoping barrels near the middle of the leg members, laterally braced by the cross member (6). The transverse horizontal axis of the connection member established by the pivot pins (12) travels vertically in a straight line, as depicted by the directional arrows in FIG. 4A. Also, the upper pivotal connections of the inner tubular sections travel in parallel with it, as depicted by the directional arrows. This creates a geometry of opposed triangles in vertical planes on opposite sides of the cart where the pivot pins (12) are at the apexes of the triangles. The connection member (18) imparts transverse bracing at this location. It is this geometry from which the structure achieves its unique strength and stability at relatively substantial heights while carrying heavy loads, reasonably secure against tipping, while collapsing to a compact size for ease of transport.

While conceivably the support structure may consist of non-extendable leg members, on which the connection member slides and pivots and the transverse pivot axis for the pins (12) becomes the point at which to raise some object, the preferred embodiment is to have extendable legs sections, as here shown, and preferably to have the extendable leg sections independently lockable in the extended position, as will now be described with reference to FIGS. 4B and 4C.

Figure 4B:
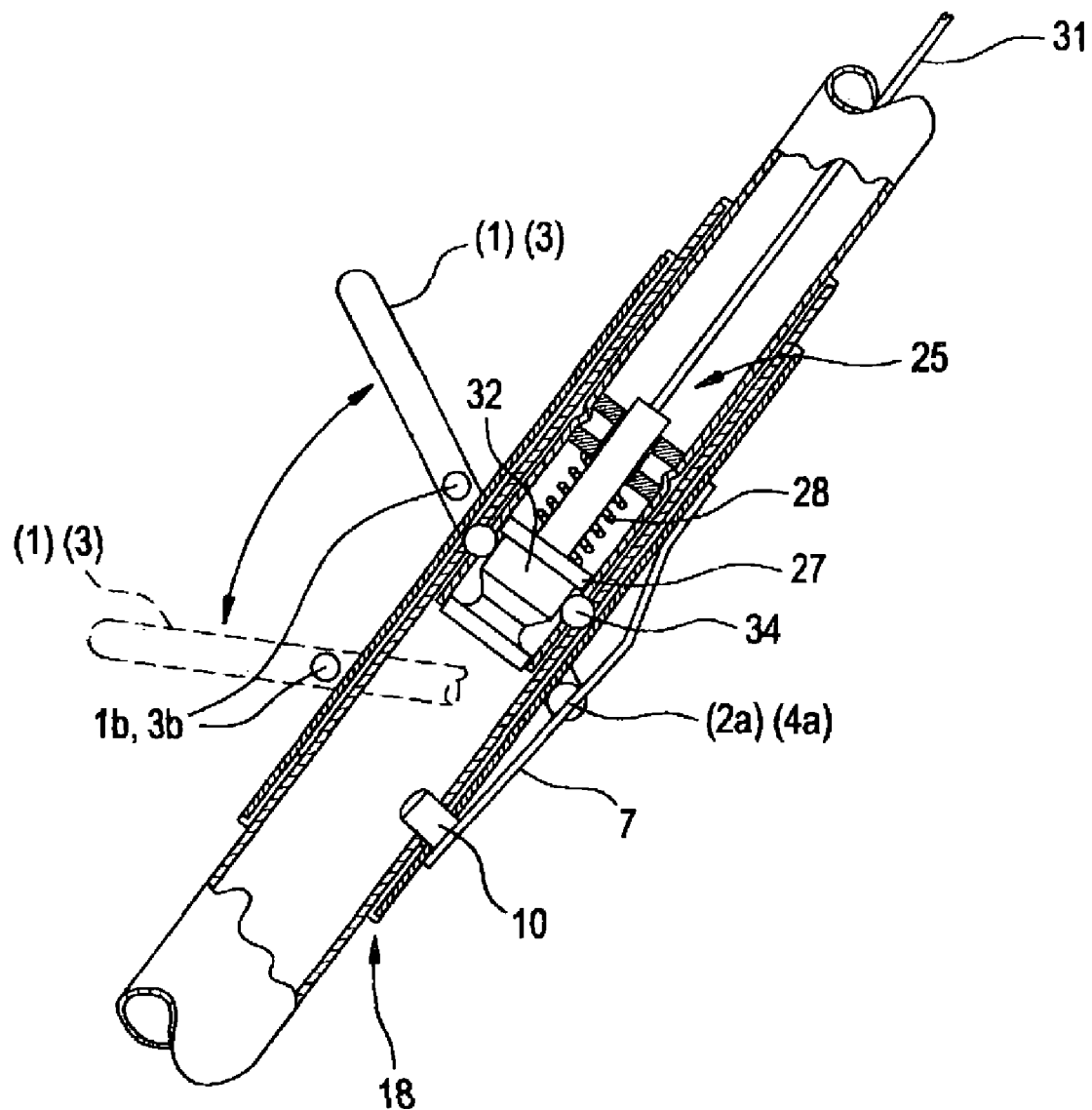
FIG. 4B is a partial longitudinal sectional view through one leg member of FIG. 4A along line 4B—4B at a sleeve element showing the leaf spring and the ball and aligned hole release for the inner tube section in the locked positions.
Figure 4C:
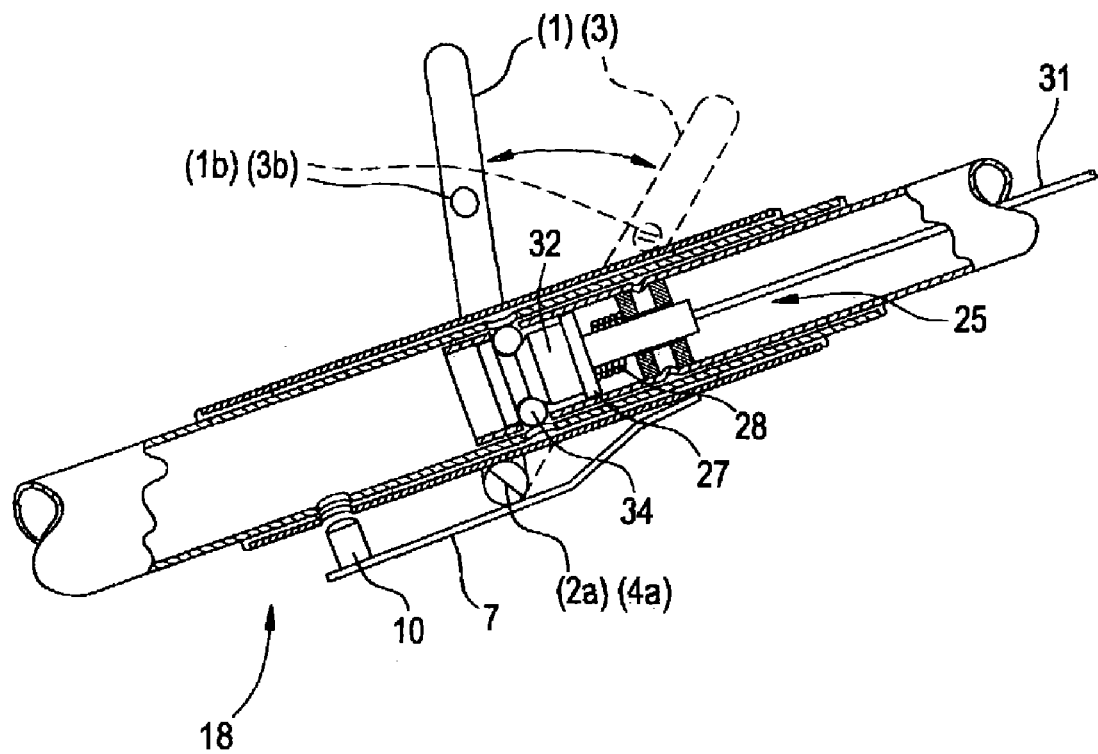
FIG. 4C is a partial longitudinal sectional view similar to FIG. 4B taken along line 4C—4C of FIG. 4A showing the related unlocked positions.

FIGS. 4B, 4C are partial, longitudinal sectional views of a leg member (17). The connection member (18) is partially shown in section through one of the sleeves (5). The butterfly handles will have both been turned to the locking or up condition positioning the cam shafts so that the flat portions (2a, 4a) lie parallel to the plane of the leaf springs (7) allowing them to engage at full extension of the sleeves (5) as they slide along the outer sections of the leg members. The locking pins (10) engage as they arrive at the holes that have aligned between the outer leg sections and holes in the sleeves. L-shaped stops (1b, 3b) project inwardly from the butterfly handles to contact the sleeves assuring the correct positioning of the cam shafts and cam flats in the locking position (solid line position in FIG. 4B).

A ball and aligned hole locking mechanism (25) is optionally preferred for locking the inner leg sections in extended position after the sleeves (5) and outer leg sections are locked. In the preferred embodiment shown, each inner tubular leg section has a circumferentially grooved plunger (27) within its barrel. The plunger has a circumferential land (32) that slides closely to the inner diameter of the barrel within the inner section. The land (32) is opposite a ball (34) as extension occurs until the ball becomes aligned with an aperture in the outer section at full extension, whereupon the ball moves outwardly, or radially, and is captured midway between the barrels by the aperture, and against the inner wall of the sleeve and the land (32). In this position it is fixed between the barrels of the two sections preventing relative movement of the leg sections. For unlocking to occur, each barrel of the inner leg sections is simultaneously released when the annular groove is aligned with the ball, see FIG. 4C. For this to occur, a pair of release handles (30), see FIG.

1, is moved upwardly in slots near the upper end of each inner leg section. This draws a rod (31) up compressing a spring (28) aligning the plunger groove with the ball which is then free to drop into the groove while remaining trapped in the hole of the inner barrel. Each ball is now free of the aperture in the outer barrel and no longer lies medially between the barrels preventing relative movement. Because the annular groove of the plunger has a depth less than the diameter of the ball by the wall thickness of the inner barrel, the ball is retained in the hole in a fixed, radially aligned position. When it is free of the aperture, each of the inner sections can now be telescoped in unison within the outer leg sections by simply pushing down on the upper frame (15). This will occur once the connection member is unlocked. For this to happen, the butterfly handles (1,3) are turned to the unlocked, full line position in FIG. 4C. Each cam flat is turned almost perpendicular to the plane of the leaf spring disengaging the locking pin from each sleeve and outer leg section. This unlocks the connection member and allows relative sliding and scissors-like motion between the sleeves and outer leg sections. This compound angular-rectilinear motion results from the combined pivotal, sliding and telescoping action of the sleeves and leg sections. The support structure is automatically pre-set in the collapsed state for locking upon being raised again. For this to occur, after each ball (34) clears the aperture, and telescoping of the barrels has commenced upon lowering, the handles (30) are released. Each ball is held in rolling frictional engagement by the annular land (32) of the plunger, the hole in the inner barrel and the inner wall of the outer barrel. Also, the butterfly handles have been turned upon collapsing to commence (FIG. 4B—dotted line position), but upon lowering the handles will be returned with the L-shaped stops (1b,3b) resting on the tops of the sleeves so the locking pins (10) are biased ready to reengage upon the next full extension.

Figure 4D:
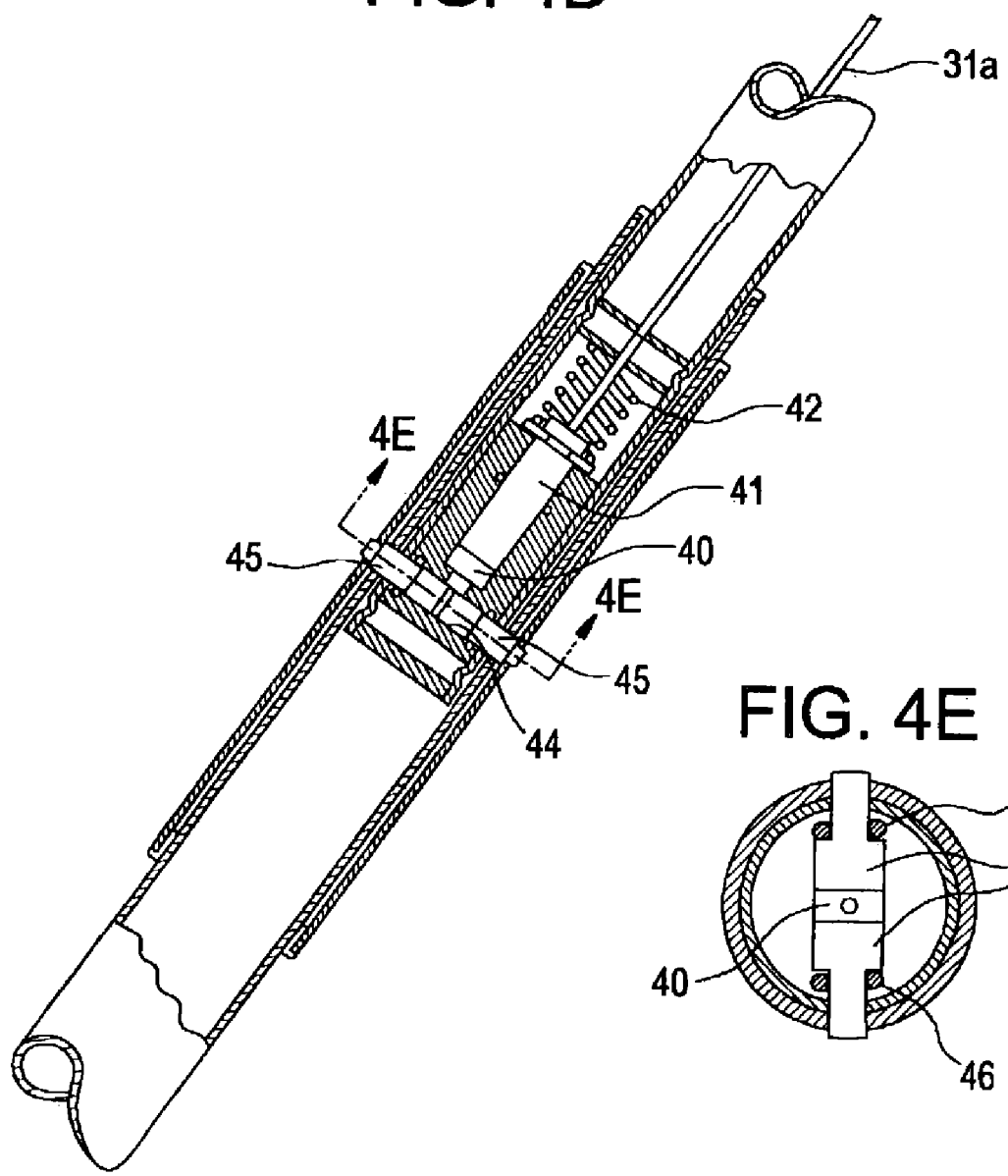
FIG. 4D is a partial longitudinal sectional view similar to FIGS. 4B and 4C but showing an hydraulic variation of the locking mechanism which could be substituted for both the leaf spring and ball and aligned hole type of locking mechanism shown in FIGS. 4B and 4C.
Figure 4E:
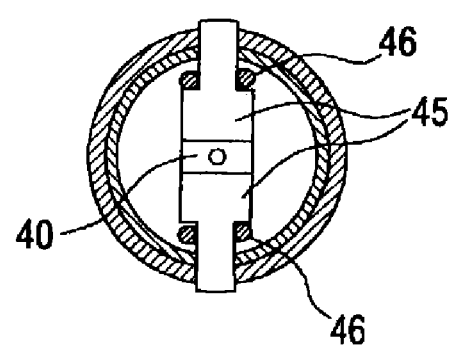
FIG. 4E is a cross sectional view along line 4E—4E of FIG. 4D of the hydraulic locking mechanism shown in the locked position.
Figure 4F:
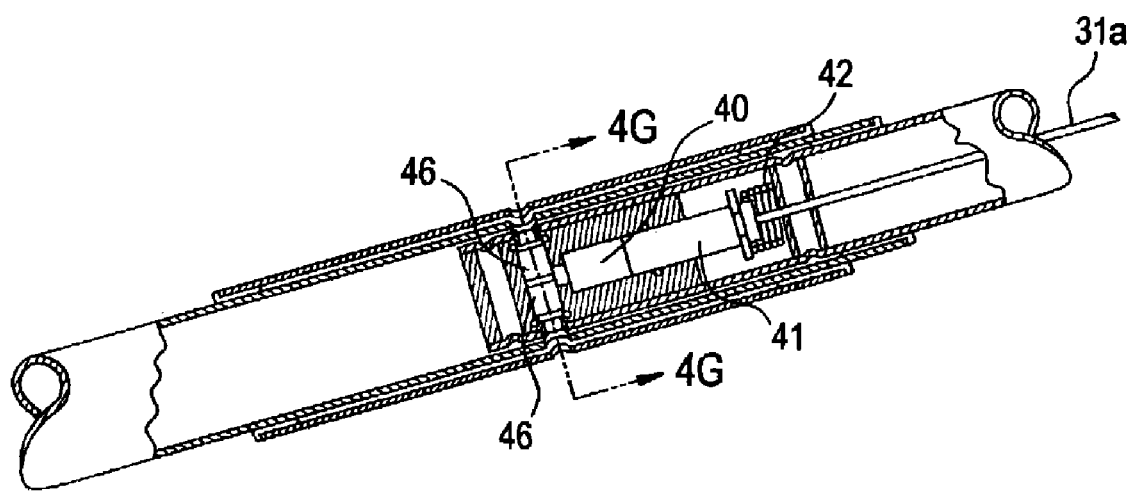
FIG. 4F is a partial longitudinal sectional view similar to FIG. 4D showing the hydraulic locking mechanism in the unlocked position.
Figure 4G:
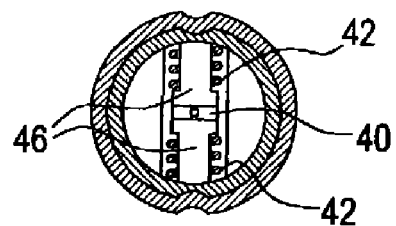
FIG. 4G is a cross sectional view along line 4G—4G of FIG. 4F.

A modification is shown in FIGS. 4D, E, F and G where only one locking mechanism is employed for both the connection member sleeves and the inner and outer leg sections. Each inner leg section has a sealed, fluid filled, chamber (40) in which a piston (41) reciprocates under the bias of coiled spring (42) compressed by pulling on rods (31a) similar to the manner described in the previous embodiment. A cross passageway (44) at the bottom of chamber (40) sealably contains locking pins (45) that are forced out into locking engagement with holes in the sleeves, and outer and inner leg section, when aligned. A return spring (46) biases each pin (45) toward the unlocked position (FIGS. 4F, G) when the piston (41) is retracted, compressing the spring (42), and relieving the hydraulic pressure in chamber (40). This arrangement differs from the preferred embodiment primarily in that only one mechanism is employed in locking both the connection member and the tubular sections of the leg members.

Figure 5:
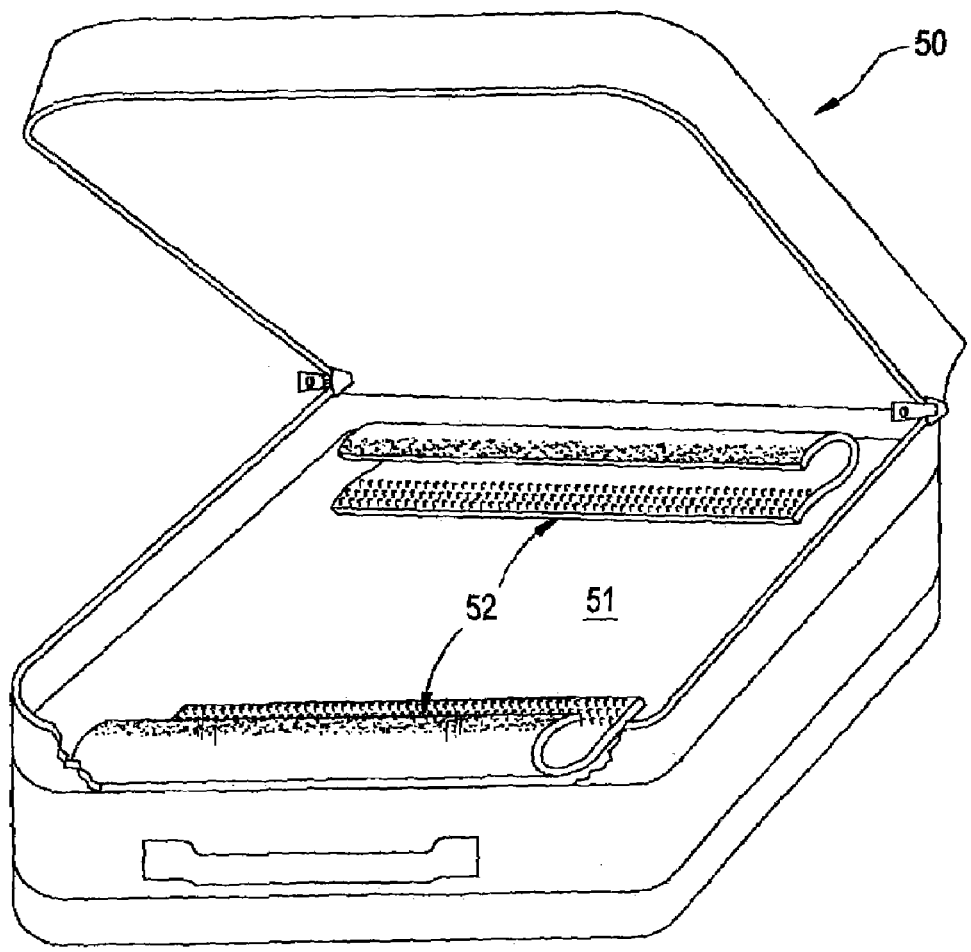
FIG. 5 is an isometric projection of a laptop case, turned over, i.e., showing the bottom of the case which has a built-in compartment to receive a smaller version of a collapsible support structure depicted in FIG. 6.
Figure 6:
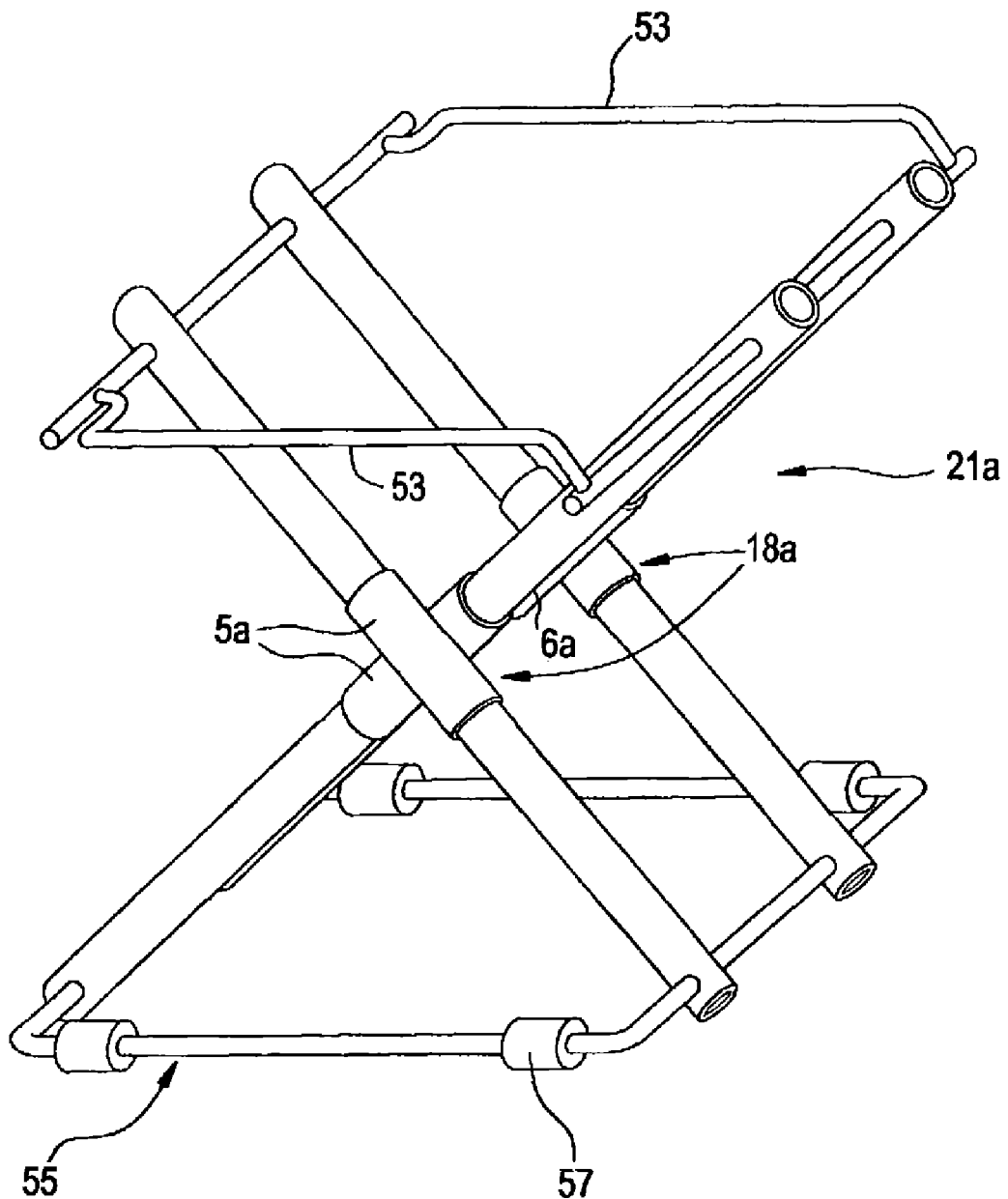
FIG. 6 is an isometric projection of such smaller collapsible support structure designed to be removably held within a bottom compartment of a laptop case and either folded up when carrying it inside the compartment, or extended when it is desirable to create a temporary elevated work station for the computer.

FIGS. 5 and 6 show a different application for the invention where a lap top case (50) has a bottom compartment (51) in which Velcro sleeves (52) removably hold a modification of the collapsible support structure. An upper frame member has opposite transverse rod ends (53) captured by the Velcro sleeves. A connection member (18a) will have sliding sleeves (5a) and a transverse cross member (6a) in the manner of the previous embodiments for stability, and the inner and outer leg section will be extended and locked in a manner as previously described. A lower frame (55) may have rollers or rubber feet (57) for setting up the computer case as a temporary work station. In passing through security at airports, the computer will normally be removed and examined separately from the case which can be placed on a conveyor for x-ray examination with the support structure folded up inside the bottom compartment (51).

These and other applications and modifications will become apparent now that the described embodiments are familiar, which equivalent structures are intended to be covered by the appended claims.

We claim:

1. A collapsible support structure comprising an upper frame and a lower frame spaced below the upper frame in substantially underlying relationship, the upper frame adapted to be collapsed onto the lower frame from a predetermined height above the lower frame, first and second pairs of leg members, each having inner and outer telescoping barrels with opposed ends that can be extended or contracted, said pairs of leg members spaced laterally apart and the opposed ends of each barrel being pivotally connected between the upper and lower frames in diagonally crossing relationship, and a connection member extending transversely between said pairs of leg members including means for pivotally joining each leg member intermediate its ends in said crossing relationship including means for sliding along the outer barrels during pivoting of the leg members, said sliding means extending a substantial longitudinal distance to provide support for the telescoping action of the barrels, and means for locking the sliding means and outer barrels, and the inner barrels to the outer barrels at the predetermined height of the upper frame, including means for releasing the locking means simultaneously from each pair of leg member rendering the sliding means, and inner and outer barrels unlocked relative to each other in unison so that each pair of laterally spaced leg members collapses in a congruent coordinated manner.

2. A collapsible support structure according to claim 1 where said means for locking the inner and outer barrels of each pair of leg members comprises: a ball and plunger arrangement cooperating between the inner and outer barrels of each leg member comprising, an element having adjacent circumferential groove and land portions slidable within each inner barrel, a pair of holes, one in each barrel, adapted to be aligned in the fully extended position of the leg members, a ball positionable within each hole by said land portion preventing relative movement of the barrels, a spring biasing the element so the land portion positions the balls within the holes of both barrels in the locking position, and means for compressing the spring to cause the holes and groove portion to become aligned allowing the balls to release from the holes in the outer barrels into the groove portion.

3. A collapsible support structure according to claim 1 wherein the means for pivotally joining each leg member and for sliding along the outer barrels during pivoting of the leg members comprises:

first and second pairs of elements carried on said first and second pairs of leg members in said diagonally crossing relationship, each pair of elements pivotally connecting said outer barrels of the respective first and second pairs of leg members and being slidable in relation thereto as the leg members are extended or contracted and said pairs of elements carrying said means for locking them and the outer barrels against relative sliding and pivotal movement at the full height of the upper frame.

4. A collapsible support structure according to claim 3 wherein said first and second pairs of elements comprises:

first and second pairs of sleeve members pivotally connected together and through which said outer barrels extend in slidable relationship, a cross member having opposed ends on which said first and second pairs of sleeve members are mounted laterally bracing the scissors-like telescoping action of the leg members as they are extended and contracted, and when fully extended and locked, forming with the leg members a structural triangular geometry of support beneath the upper frame at the working height, said means for locking the inner and outer barrels operable to lock the leg members when extended and said means for locking the pairs of sleeve members and outer barrels comprising a pair of leaf springs, one carried on each sleeve member having a locking pin thereon, an aperture in each sleeve member, said locking pin biased toward the aperture in each sleeve member, each outer barrel having an aperture, which in the fully extended position of the leg members, becomes aligned with said apertures in the sleeve members allowing the locking pins to enter said apertures of the barrels and lock the outer barrels and sleeve members against relative sliding movement.

5. A collapsible support structure according to claim 4 wherein said means for locking the sleeve members and outer barrels comprises:

a pair of cam members, one associated with each leaf spring, rotatable into caming engagement with each leaf spring to lift each locking pin out of the apertures of the outer barrels unlocking the sleeve members and outer barrels to permit relative sliding and pivotal movement.

6. A collapsible support structure according to claim 5 wherein said means for locking said sleeve members and outer barrels comprises:

a pair of handles associated with each pair of cam members rotatable to cause said cam members to lift said leaf springs in unison.

7. A method of providing a compact, portable work platform in which there is an upper frame capable of being raised above a lower frame, locked in the raised position, unlocked, and returned to the lowered position utilizing the collapsible support structure according to claim 6.

8. The method according to claim 7 wherein said lower frame has spaced ground engaging wheels for negotiating uneven surfaces.

9. The method according to claim 7 wherein the compact, portable work platform is a carrying case having upper and lower compartments and said collapsible support structure is removably secured within said lower compartment.

10. The method according to claim 9 wherein the upper compartment is designed to removably contain a laptop computer.

11. A collapsible support structure having a pair of elongated leg members in a crossed relationship to each other, each having inner and outer telescoping barrel sections with opposed ends, the leg members pivoting and extending between a collapsed and extended state in a scissors supporting action, the combination comprising, a frame member to which one opposed end of each barrel section is pivotally connected space a distance apart as determined by the crossed relationship of the leg members in the collapsed state, a pair of sleeve members pivoting adjacent each other, one slidable on each leg member in crossed relationship with the crossed leg members providing the pivotal location for the scissors supporting action of each leg member, each sleeve member having a relatively long body portion extending a sufficient length of the leg member to provide longitudinal tubular support during the telescoping action of the barrel sections, said scissors supporting and telescoping action occurring in a congruent manner coordinated so the pair of leg members act as a single operational unit with stability and strength, and a locking mechanism adapted to be engaged automatically between each sleeve member, and the inner and outer barrel sections, to prevent relative sliding and pivotal motion when extended, including a release mechanism actuated simultaneously unlocking each sleeve member and the barrel sections in a coordinated manner to permit collapsing the leg members in unison.

12. A mobile conveyance in combination with a collapsible support structure according to claim 11 providing the support and mobility, and in addition comprising, a plurality of pairs of leg members, each pair in laterally spaced relationship to the other, and a cross member having opposed ends on which said pairs of sleeve members are attached in pivotal relationship, the cross member extending transversely near the middle of the pairs of leg members.

* * * * *